(12) United States Patent
Xu et al.

(10) Patent No.: US 8,660,102 B2
(45) Date of Patent: Feb. 25, 2014

(54) METHOD OF EXPLOITATION OF CO-CHANNEL INTERFERENCE, APPARATUS AND COMPUTER PROGRAM

(75) Inventors: Weixiao Xu, Paris (FR); Fabien Buda, Paris (FR); Serdar Sezginer, Boulogne Billancourt (FR)

(73) Assignee: Sequans Communications, Puteaux (FR)

( * ) Notice: Subject to any disclaimer, the term of this patent is extended or adjusted under 35 U.S.C. 154(b) by 94 days.

(21) Appl. No.: 13/306,464

(22) Filed: Nov. 29, 2011

(65) Prior Publication Data

US 2012/0140683 A1 Jun. 7, 2012

(30) Foreign Application Priority Data

Nov. 29, 2010 (EP) .................................... 10192864

(51) Int. Cl.
*H04W 4/00* (2009.01)
*H04W 84/12* (2009.01)

(52) U.S. Cl.
CPC .................................... *H04W 84/12* (2013.01)
USPC ............................ 370/338; 370/208; 375/265

(58) Field of Classification Search
USPC ......... 370/203–208, 241–252, 338; 455/63.1, 455/296
See application file for complete search history.

(56) References Cited

U.S. PATENT DOCUMENTS

2007/0005749 A1* 1/2007 Sampath ........................ 709/223
2007/0190945 A1* 8/2007 Lee et al. ...................... 455/63.1
2007/0249350 A1* 10/2007 Jung et al. ..................... 455/436

FOREIGN PATENT DOCUMENTS

EP 1475933 A1 11/2004
EP 1802000 A1 6/2007

OTHER PUBLICATIONS

European Search Report dated Apr. 11, 2011 for corresponding European Application No. 10192864.6, filed Nov. 29, 2010.

* cited by examiner

*Primary Examiner* — Kan Yuen
(74) *Attorney, Agent, or Firm* — David D. Brush; Westman, Champlin & Koehler, P.A.

(57) ABSTRACT

A method of canceling co-channel interference of a signal received by a mobile station having at least two receiving antennas, in a cellular OFDMA-TDD communication network having a serving base station and at least one interfering base station. The signal is a result of a serving signal transmitted by the serving base station which is distorted by at least one interfering signal transmitted by the interfering base station. The serving signal is transmitted with a first modulation scheme and the interfering signal is transmitted with a second modulation scheme. The method includes: a channel estimation phase delivering channel estimations of the serving signal and the interfering signal; and a MIMO detecting phase, detecting symbols by using the channel estimations of the serving signal and the interfering signal. The MIMO detection phase is realized using a non-linear method which uses the first modulation scheme and the second modulation scheme.

9 Claims, 2 Drawing Sheets

METHOD OF EXPLOITATION OF CO-CHANNEL INTERFERENCE, APPARATUS AND COMPUTER PROGRAM

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of wireless communications and more particularly to a method and apparatus for the exploitation of co-channel interference in the case of the "Reuse-1" deployments in cellular networks. The disclosure is more specifically applied in a cellular OFDMA TDD network.

Wireless communication networks, such as cellular networks, operate by sharing resources among the mobile stations operating in the communication network. As part of the sharing process, resources such as time, subcarriers and codes, etc., are managed by at least one controlling equipment within the communication network. Certain types of wireless communication networks, e.g., orthogonal frequency division multiplexed (OFDM) networks, are used to support cell-based high speed services such as those under the IEEE 802.16 standards (WiMAX for example).

OFDMA technology uses an approach based on the division of a wireless communication channel in the frequency domain into sub-channels which can be used by multiple mobile stations at the same time. These mobile stations are often subject to the interference coming from neighbour cells which are adjacent to the current which cell the serving base station is belonging to. This occurs because neighbour base stations can use the same frequency and time resources as the ones used by the current (serving) base station.

BACKGROUND OF THE DISCLOSURE

Nowadays, frequency reuse-1 is preferred in the terms of frequency efficiency. However, in cellular communication systems, the choice in favor of reuse-1 results in interference from the neighbor bases stations which may not be negligible. In order to ensure reliable communication, this interference should be appropriately handled. However, the treatments of the interference tend to require more complicated development in the whole system, such as intelligent beamforming antenna, or network coordination.

The dominant co-channel interference appears often at the cell edges where the handoff is about to happen. Before the handoff, the targeted base station is actually the dominant co-channel interference. And, in most communication systems, the handoff operation is often triggered when the SINR (Signal to Interference-plus-Noise Ratio) value is below a certain threshold. This SINR threshold may be set to a very low level in order to avoid the "ping-pong" effect; however, this causes the mobile station to perform in a difficult situation with strong interference.

Figure 1:
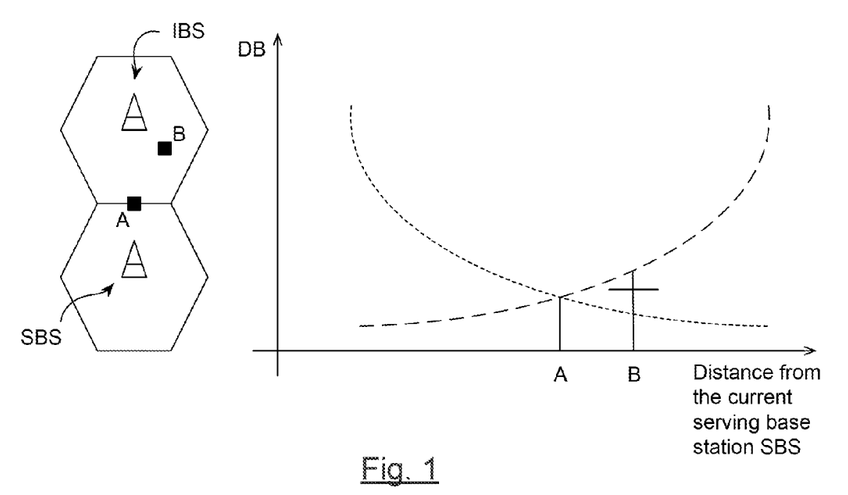
FIG. 1, already commented, is a block diagram of an interfering situation where the interfering signal becomes more and more powerful as the mobile station goes away from the serving base station.

For example, in FIG. 1, mobile station MS receives the signals from serving base station SBS with power C, and it also receives the interference from the dominant interfering base station IBS with power $I_d$. Generally, at the cell edges, such as at the point A, the serving signal power level C is comparable with the dominant interference level $I_d$. But the system still "observes" the targeted interfering base station IBS behavior before switching the connection to it. For instance, the handoff is launched when the mobile station MS is in the position B. From the curves in FIG. 1, we can deduce that while the mobile station BS is moving from point A to point B, the communication quality with the serving base station SBS gets worse since the interference level $I_d$ becomes stronger than the desired power level C. Accordingly, the connection can be lost before the handoff operation is successfully completed.

It is worth noting that the increased interference phenomenon can be used as a trigger for handoff. Furthermore, with appropriate interference exploitation, the handoff threshold can be set to even a lower level in order to avoid "ping-pong" effect.

This interference issue could be highly critical in practical communication systems and proper handling of the interference results in a considerable performance improvement. For example, in WiMAX systems, the first PUSC (partial usage of subcarriers—to use a predetermined number of subcarries instead of using all the subcarries) zone contains FCH (frame control header) which contains the information of DL-MAP and UL-MAP), DL-MAP (allocation information of DL subframe) and UL-MAP (allocation information of UL subframe) information, and this zone gives the allocation information of the data zone (zone following the $1^{st}$ PUSC zone) from the corresponding base station. The data part is less affected by the interference from interfering base stations because, its performance loss can be compensated by some retransmission mechanisms. However, particularly in reuse 1 deployments, different base stations transmit their signals in the first PUSC zone by using the same frequency resources. The FCH/DL-MAP is transmitted in the first slot array and interfered by other base stations.

Therefore, without the reliable decoding of FCH/DL-MAP part, the users may suffer from the co-channel interference and this results in a poor connection quality. As discussed above, this is particularly important during handoff operation. When the received power from the interfering BS becomes stronger (e.g., moving from point A to point B in FIG. 1), the FCH/DL-MAP part of the serving base station becomes more and more vulnerable. In such a case, while mobile station is negotiating to switch to the powerful interfering base station, the connection can be lost.

SUMMARY

An embodiment of the invention relates to a method of cancelling co-channel interference of a signal received by a mobile station, comprising at least two receiving antennas, in a cellular OFDMA-TDD communication network comprising one serving base station and at least one interfering base station, wherein said signal being a result of a signal transmitted by said serving base station which is distorted by at least one signal transmitted by said at least one interfering base station wherein said signal of said serving base station is transmitted with a first modulation scheme and wherein said signal of said interfering base station is transmitted with a second modulation scheme.

According to an embodiment of the invention, said co-channel interference cancellation method comprises:
- a channel estimation phase delivering a channel estimation of a serving signal transmitted by said serving base station and a channel estimation of an interfering signal transmitted by said at least one interfering base station,
- a MIMO detecting phase, detecting symbols by using said channel estimation of said serving signal and said channel estimation of said interfering signal.

and characterised in that said MIMO detection phase is realized using a non-linear method which uses said first modulation scheme and said second modulation scheme.

Thus, an embodiment of the invention allows canceling co-channel interference of a signal simply by using a virtual MIMO processing method in an existing mobile station for obtaining information coming from several base stations. Furthermore, the method does not require modifying the structure or the behavior of the base stations since it is not necessary to constraint the transmission of the signal. Thus, the method is costless and efficient. In other words, the method is transparent to the already-existing systems and does not require any modification on the BS side. The method can also be used for good SINR conditions in order to have performance improvement.

According to a specific embodiment, said method comprises, before said channel estimation phase, a pre-processing phase which comprises:
- receiving said signal,
- extracting at least one information from at least two preambles present in said received signal,
- deciding whether a dominant interfering base station exists in view of said information extracted from said at least two preambles, and when a dominant interfering base station exists:
- processing said a channel estimation phase and said MIMO detecting phase.

According to a particular feature, said at least one information extracted from said at least two preambles belongs to the group comprising:
- power level of said serving base station and of said at least one interfering base station,
- system level parameters of said serving base station and of said at least one interfering base station.

The information which are extracted from the at least two preambles are for example power level and system level parameters such as scrambling code of each base station.

In another specific embodiment of the invention, the information is not extracted from the two preambles but is directly received in the mobile station in another way, such as a direct transmission from the serving base station (which indicates to the mobile station, the power level and system level parameters of neighbor base stations).

According to an embodiment, said channel estimation phase comprises generating a channel estimation of said received signal by choosing an appropriate method, in view of said at least two preambles.

According to a specific embodiment, said channel estimation generating step comprises:
- estimation of the serving channel of said serving base station is first made by using serving pilots, without taking into account interfering pilots,
- estimation of the interfering channel of said interfering base station is then made by using interfering pilots, without taking into account serving pilots.

According to a specific embodiment, said channel estimation generating step comprises an iterative process in which:
- estimation of the serving channel of said serving base station is first made by using serving pilots, without taking into account interfering pilots,
- estimation of the interfering channel of said interfering base station is obtained based on the interfering pilot by subtracting the reconstructed serving signal, by multiplying the known serving signal with the estimated serving channel.

Furthermore, the resulting estimate of the interfering channel can also be used to improve further the estimation of the serving channel.

According to a specific embodiment, said iterative process is improved by a measured $C/I_d$ value, where C denotes the received power of serving symbols and $I_d$ denotes the interfering base station power, said measured $C/I_d$ value being obtained from said at least two preambles, and comprises:
- when said C value is greater or equal to said $I_d$ value:
  - estimation of the serving channel of said serving base station is first made by using serving pilots, without taking into account interfering pilots,
  - estimation of the interfering channel of said interfering base station is obtained based on the interfering pilot by subtracting the reconstructed serving signal, by multiplying the known serving signal with the estimated serving channel,
- when the C value is smaller than $I_d$ value:
  - estimation of the interfering channel of said serving base station is first made by using interfering pilots, without taking into account serving pilots,
  - estimation of the serving channel of said serving base station is obtained based on the serving pilot by subtracting the reconstructed interfering signal, by multiplying the known interfering signal with the estimated interfering channel, According to a specific embodiment, before processing said iterative process, an initial channel estimation is done by using said at least two preambles, said initial channel estimation being used by said iterative process.

According to an embodiment of the invention, said MIMO detecting phase comprises:
- detecting the desired and interfering streams by a MIMO detector in view of said channel estimation of said received signal,
- extracting symbols transmitted from said serving base station and/or interfering base station for further treatment.

In another aspect, an embodiment of the invention relates to an apparatus for cancelling co-channel interference of a signal received by a mobile station, comprising at least two receiving antennas, in a cellular OFDMA-TDD communication network comprising one serving base station and at least one interfering base station, wherein said signal being a result of a signal transmitted by said serving base station which is distorted by at least one signal transmitted by said at least one interfering base station, wherein said signal of said serving base station is transmitted with a first modulation scheme and wherein said signal of said interfering base station is transmitted with a second modulation scheme.

According to an embodiment of the invention, said co-channel interference cancellation apparatus comprises:
- channel estimation means, delivering a channel estimation of a serving signal transmitted by said serving base station and a channel estimation of an interfering signal transmitted by said at least one interfering base station, a MIMO detecting means, detecting symbols by using said channel estimation of said serving signal and said channel estimation of said interfering signal.

and characterised in that said MIMO detection phase is realized using a non-linear method which uses said first modulation scheme and said second modulation scheme.

In another aspect, an embodiment of the invention relates to a computer program product downloadable from a communications network and/or stored on a non-transitory computer-readable medium and/or executable by a microprocessor, said computer program product comprising program code instructions for cancelling co-channel interference of a signal received by a mobile station, comprising at least two receiving antennas, in a cellular OFDMA-TDD communication network comprising one serving base station and at least one interfering base station, wherein said signal being a result of a signal transmitted by said serving base station which is distorted by at least one signal transmitted by said at least one interfering base station, wherein said signal of said serving base station is transmitted with a first modulation scheme and wherein said signal of said interfering base station is transmitted with a second modulation scheme.

According to an embodiment of the invention, said computer program comprises code instructions for implementing:
- a channel estimation phase delivering a channel estimation of a serving signal transmitted by said serving base station and a channel estimation of an interfering signal transmitted by said at least one interfering base station,
- a MIMO detecting phase, detecting pilots by using said channel estimation of said serving signal and said channel estimation of said interfering signal.

and characterised in that said MIMO detection phase is realized using a non-linear method which uses said first modulation scheme and said second modulation scheme.

BRIEF DESCRIPTION OF THE DRAWINGS

The proposed method is described in the following by way of examples in connection with the accompanying figures without limiting the scope of the protection as defined by the claim. The figures show:

DETAILED DESCRIPTION OF ILLUSTRATIVE EMBODIMENTS

1. Main Features of an Embodiment of the Invention

In the present disclosure, a technology which ensures a reliable communication performance is presented. More specifically, the presented co-channel interference cancellation method is proposed to improve the connection performance especially during the handoff operation and decrease the connection loss probability. WiMAX system is presented as an example in a specific embodiment but the general technique can be used for other similar technologies like LTE where we first decode the broadcasted control information then the data parts.

The method is employed in a system where mobile station is receiving signal from one serving base station and one dominant interfering base station, where both of these base stations are synchronized (this is always the case in TDD systems) or can be synchronized.

In such a system, it is considered that in the transmitted frame there exists a common control region where both base stations use single transmit antenna scheme (or equivalent transmit diversity technologies like cyclic delay diversity (CDD) technique) and the same modulation scheme (or at least a first known modulation scheme for the serving base station and a second known modulation scheme for the interfering base station). In such a case, the inventors had the idea to use existing MIMO detecting techniques for co-channel interference exploitation, with a particularity situated in the feature of using the information of both first and second modulation scheme in a non linear method).

Thus, a method is proposed for co-channel interference (CCI) cancellation in order to improve the performance during handoff and decrease the connection loss probability. Below, particular attention is given to WiMAX TDD systems. In such systems, a preamble sequence is transmitted at the beginning of the downlink frame and from this preamble sequence, it is possible to extract base station specific information such as pseudo noise (PN) scrambling sequences used in the transmission and the received power from every base station in the handoff candidate list. Moreover, in first PUSC zone, it is mandatory to use QPSK, and the symbols are sent by one antenna (or using some equivalent transmit diversity techniques such as CDD, but this will be transparent to the receiver and the proposed method is still applicable without any modification). In other words, from the receiver point of view, the modulation and coding scheme and transmission modes of other base stations are perfectly known. However, each base station uses the same pilot pattern at the same location. So the pilots belonging to the serving base station is interfered at the received signal by the interfering base stations. Combining all these standard specific properties, the communication performance can be improved based on the proposed method which is presented below in more details.

The general steps of the CCI cancellation method are:
- an appropriate channel estimation phase, and
- a MIMO detecting phase, using an existent MIMO detector at the receiver.

More particularly, the channel estimation phase comprises:
a. receiving the signal from serving base station distorted by the signal from interfering base stations,
b. extracting the information from the preambles (power level and system level parameters such as scrambling code of each BS),
c. deciding whether a dominant interfering BS exists,
d. generating channel estimation by choosing an appropriate method.

Steps a to c are implemented in a preprocessing phase for deciding whether there is a need to further process with the channel estimation phase and the MIMO detecting phase.

The MIMO detecting phase comprises:
a. Detecting the desired and interfering streams by MIMO detector.
b. Extracting only the symbols transmitted from desired BS for further treatment.

It is also worth noting that the presented context can be adapted to the systems like LTE where firstly a synchronization sequence is used for synchronization and cell detection, then secondly, a control information is used in order to identify the related information for further decoding stages. The only requirement for using the presented technique is to have synchronous transmission from the base stations which is the case for example in TDD systems.

In other words, for other similar TDD-based technologies like LTE, the first step is to decode the broadcasted control information and the second step is to decode the data parts. Particularly for LTE, the pilots also use descrambling sequences which will help estimating the channel. Moreover, in this scenario, the broadcast and control information is modulated using the same modulation format from both base stations. This allows using the same method for co-channel interference cancellation. The main difference of LTE from WiMAX is the fact that the pilots generally do not overlap. Therefore, for channel estimation, in such cases the first proposed approach is more suitable and the above presented iterative methods need to be modified in order to make them suitable for such systems.

The proposed technique has the following advantages:
- the technique is transparent to the base stations and only requires an implementation at the mobile station side. It significantly improves the performance in dominant co-channel interference existing cases,
- the technique uses already existing MIMO detection techniques to cancel CCI which are already used for MIMO transmission,
- the technique estimates virtual MIMO channel based on already existing channel estimation technologies,
- the technique cancels CCI in the $1^{st}$ PUSC zone where both serving and interfering base stations use single input transmission with known modulation format (i.e., no MIMO transmission is allowed in this zone).
- the technique takes advantage of the special property of the standards and adapts the existing estimation and detection techniques in order to eliminate the interference in a transparent way.

It is worth noting that, since the MIMO detecting phase allows detecting both the FCH/DL-MAP of the serving signal and the interfering signal, decoding the information (coming from the two base stations) can be used for preparing a handover phase from the serving base station to the interfering base station.

2. Description of a Specific Embodiment 2.1. Requirements

In this embodiment, the procedure for canceling a dominant CCI is based on some specific properties of WiMAX profile which is derived from IEEE 802.16e specifications. In addition, the information from the interfering base station is also proposed to be decoded in order to exploit the interference information for further processing. Particular attention is given to WiMAX TDD frame structure.

In this embodiment, the method is presented for a scenario occurring during the handoff operation. It is also worth noting that, for any similar situation where a dominant interference exists, this interference cancellation method can be similarly applied. In an embodiment of the present invention, it is be assumed that the two signal streams from two base stations are synchronized both in frequency and time domain within an accuracy which is generally defined in standard requirements. In such systems, the degradation caused by a reasonable time and/or frequency offset can be acceptable.

Figure 2:
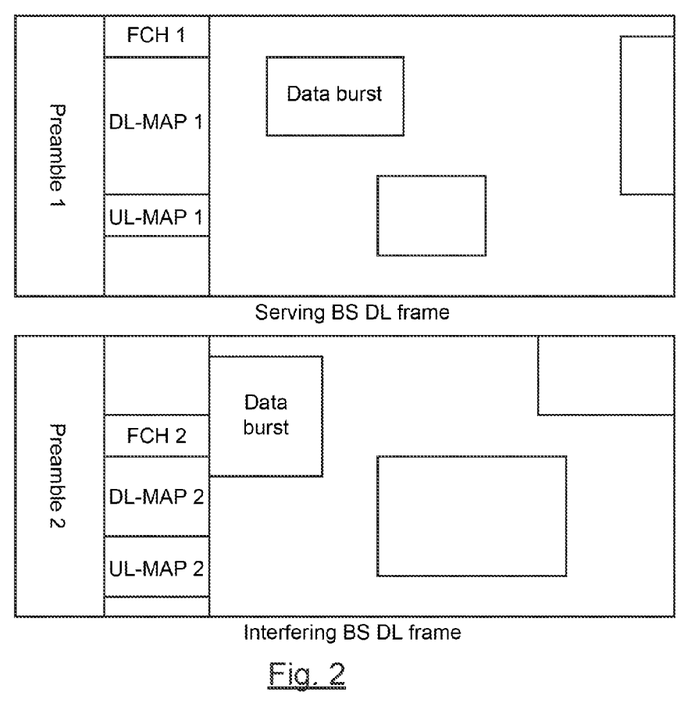
FIG. 2, describes a frequency reuse-1 case where it can be seen that the $1^{st}$ PUSC zone of serving base station SBS is distorted by the interfering base station IBS.

The presented system model is composed of a serving base station SBS, an interfering base station IBS and a mobile station MS. When a frame received from the serving base station SBS is interfered by an interfering base station IBS, the desired and interfering frames overlap each other in reuse-1. From FIG. 2, where reuse-1 case is depicted, it can be seen that the $1^{st}$ PUSC zone of serving base station SBS is distorted by the interfering base station IBS, so that the important information about the allocation of data zone can be lost. Therefore, in order to have reliable decoding of information in this zone, an appropriate interference cancellation is needed.

Below, the method is described in detail for the $1^{st}$ PUSC zone where the transmission mode is single-input multiple outputs. In other words, the base stations are not allowed to use any MIMO transmission and the mobile station has at least two antennas.

2.2. Description

Based on the conditions mentioned above, the inventors have noticed that the system can be viewed as a virtual 2×2 MIMO system, so any kind of MIMO detector suitable for decoding spatially multiplexed schemes can be used.

Of course, the method proposed can be extend in the case the mobile station has more than two antennas. In such a case, it is possible to cancel co-interference for more than one interfering base station (i.e. for example for three interfering base station if there are four receiving antennas in the mobile station).

Actually, virtual MIMO has been widely studied during the past years in the context of UL transmission and already included in the standard specifications. For example, in IEEE 802.16e, such a transmission is introduced as the multiuser case, namely, collaborative spatial multiplexing. In this mode of transmission, the pilots from different mobile stations use different resources which allow interference free channel estimation. But, virtual MIMO for DL transmission relies more on system level requirements and, therefore, it has not been investigated widely.

According to the WiMAX profile, the FCH/DL-MAP/UL-MAP zone is required to be modulated with QPSK modulation. Thus, it is known by the mobile station that the interference from other base stations on the same zone use the same modulation. Moreover, each base station uses the same pilot pattern in the SIMO zone, so the pilot sequences from two base stations overlap each other. But the pilot sequences are pseudo randomized by the different scrambling codes which are known by the mobile stations.

Figure 3:
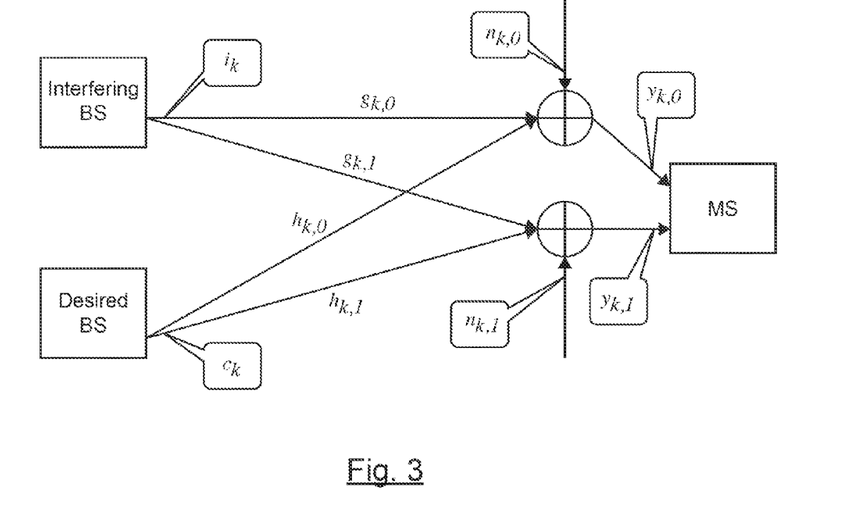
FIG. 3 illustrates the principles on which the method relies.

Thus, the received signals $y_{k,0}$ and $y_{k,1}$ at a given subcarrier index k on receive antennas 0 and 1 are given as:

$$\begin{pmatrix} y_{k,0} \\ y_{k,1} \end{pmatrix} = \begin{pmatrix} h_{k,0} \\ h_{k,1} \end{pmatrix} c_k + \begin{pmatrix} g_{k,0} \\ g_{k,1} \end{pmatrix} i_k + \begin{pmatrix} n_{k,0} \\ n_{k,1} \end{pmatrix} \quad \text{(equation 1)}$$

where $h_{k,0}$, $h_{k,1}$ ($g_{k,0}$, $g_{k,1}$) and $c_k$ ($i_k$) are the channel coefficient and the transmitted symbol corresponding to the serving base station (interfering base station) on receive antennas 0 and 1, respectively, and $n_{k,0}$, $n_{k,1}$ denotes the noise and interference from other base stations on receive antennas 0 and 1 of the mobile station. In equation 1, the $c_k$ and $i_k$ may contain either pilot or data symbols. This situation is illustrated in FIG. 3.

At the beginning of the process, the receiving mobile station needs to decide whether a dominant interfering base station exists or not. This is performed based on the knowledge of received signal powers from neighbor base stations and a certain predetermined threshold. If the received power from a base station is higher than the predetermined threshold, then the CCI cancellation mode is switched on.

According to the disclosure, as already explained, the dominant co-channel interference can be cancelled by a procedure containing the following phases:

an appropriate channel estimation phase, and
a MIMO detecting phase.

2.2.1. Channel Estimation Phase

For the channel estimation phase, four example methods are introduced below:

1) Channel estimation can rely on the assumption that the pilot sequences are perfectly orthogonal. In this case, the descrambling of the pilot signal with the sequence corresponding to the serving base station may eliminate the interference from the interfering base station considerably. So, the estimation of the channel of the serving base station can be done by any kind of single antenna channel estimators. In parallel, by descrambling the pilot signal with the sequence corresponding to the interfering base station, the channel of the interfering base station may also be estimated independently with sufficient accuracy. Then, the estimated channel information of the two base stations is fed to the decoder afterwards.

2) Due to channel distortions introduced by multi-path channel, the pseudo-orthogonality between the PN sequences may be lost. In addition, in WiMAX systems, the pilot sequence is just a part of the PN sequence, so the two pilot sequences are possibly not perfectly orthogonal. Then, an iterative channel estimation method can be a solution to improve the performance. The estimation of the desired channel can be made first by using the serving pilot, without taking into account of interfering pilot. Then, the estimation of the interfering channel is obtained based on the interfering pilot after by subtracting the reconstructed serving signal, by multiplying the known serving signal with the estimated serving channel. The resulting estimate of the interfering channel can also be used to improve further the estimation of the serving channel.

3) The previous iterative channel estimation method can be improved by using additional information available at the mobile station side. The mobile station can detect the power of the neighbor base stations, e.g., by the preamble. Therefore, the iterative channel estimation method can be improved based on the measured $C/I_d$ value, where C is denotes the received power of desired symbols and $I_d$ denotes the interfering base station power. If the C value is larger than $I_d$, then the estimation of the serving channel is first made by using the pilots corresponding to the serving base station. Then, the estimation of the interfering channel is obtained by the interfering pilots and the previously estimated channel of the serving base station. And, this estimation of the interfering channel can be used to update the estimation of the serving channel. This is the same iterative channel estimation method as the previous method (2)). On the other hand, if the C value is smaller than $I_d$, then the estimation of interfering channel is first made based on interfering pilot, and the process is followed as in the previous case.

4) The standard requires that preambles for adjacent cells use different frequency segments. During the handoff, the serving base station and the dominant interfering base station are most likely adjacent, so their preambles are on different segments. Particularly, in WiMAX system 114 different orthogonal preamble sequences are defined. The orthogonality among them is guaranteed by no matter which frequency reuse is used. This property can be used to improve the performance as proposed below. Since the $1^{st}$ PUSC zone is coming just after the preamble, other than relying solely on the pilots, the preamble can also be used to improve the channel estimation. In such a case, the initial channel estimation can be made based on the preamble and, if desired, the above mentioned iterative methods can be used to improve the channel estimations for the $1^{st}$ PUSC zone. It is worth noting that the orthogonality of the preambles results in a considerably reliable initial channel estimation.

Actually, the channel estimation by using orthogonal sequences has been widely developed in CDMA system. However, the difference is, for example in WiMAX, a pseudo-noise scrambling coded is applied all over the sub-carriers, while the pilots are located on some of the subcarriers, which weakens the orthogonality. Therefore, for the specific scenario described above for two base stations, the two pilot sequences belonging to the base stations are not perfectly orthogonal, and a proper iterative procedure on channel estimation results in a remarkable gain.

2.2.1.1. Details about the Iterative Channel Estimation (an Example is Given for the Third Proposed Channel Estimation Method)

The inventors have formulated the problem of the reception of the signals (serving and interfering one) by the mobile station in view of the situation presented in FIG. 3.

We simplify the equation 1 by deleting the receiver antenna index 0 and 1, because the channel estimation is the same for different receiver antenna. Then the received signal can be presented as:

$$y_k = h_k c_k + g_k i_k + n_k \qquad (2)$$

The estimation of the desired channel is made first by any kind of conventional channel estimation technology based on the desired pilot $c_k$, without taking into account interfering pilot.

To be more specific, in our WiMax simulation test, the channel estimation of cluster (which contains 4 pilots and 24 data) is done by linear MMSE estimator per cluster on the 4 pilot positions. Then the channel on the data position is done by interpolation in frequency domain all over the 14 subcarriers in a given cluster. However, for the middle steps of the proposed iterative channel estimation, only estimation of 4 subcarriers on which locate 4 pilots is needed. So extracting the 4 channel coefficients from 14, we have the initial estimation of desired channel on the 4 pilot positions $\hat{\vec{h}}^1$, where the superscript 1 means the first iteration, ^ means it's an estimated value. The vector $\vec{h}$ means this contains the 4 channel coefficients on the pilot positions. $\vec{y}$ is the received signals corresponding to $\vec{h}$. Same for $\vec{c}$, $\vec{i}$ and $\vec{g}$.

Then, for the same cluster, the estimation of the interfering channel is obtained based on the interfering pilot by subtracting the reconstructed interfering signal, by multiplying the known interfering signal with the estimated interfering channel such as the input of the estimator is $(\vec{y} - \hat{\vec{h}}^1 \vec{c})$. Based on the known interfering pilot sequence $\vec{i}$, the interfering channel is estimated in the first iteration, noted as $\hat{\vec{g}}^1$.

The second iteration is based on the result got from the first iteration. Still, the serving channel is estimated first. The input of the estimator should be $(\vec{y} - \hat{\vec{g}}^1 \vec{i})$. The output of the estimator is $\hat{\vec{h}}^2$. The iterative channel estimation can go on in the same way afterwards as presented.

When it comes to the last iteration, in order to get the final channel estimation, the channel coefficients of all the 14 subcarriers in the cluster for both the serving and interfering channels are estimated.

At the end of this channel estimation phase, the channel of the serving base station and the channel of the interfering base station have been estimated and can be given to the MIMO decoder.

2.2.2. MIMO Detection Phase

With the use of an appropriate channel estimation method, such as described previously, the remaining step is the detection of two data streams belonging to the two base stations (serving and interfering). As explained above, in the $1^{st}$ PUSC zone, it is mandatory to know the modulation scheme. Indeed, for this zone, both the modulation format and coding scheme are known. So, it resembles a simple spatial multiplexing transmission. Therefore, conventional MIMO detection methods can be used to detect both serving and interfering symbols, and, then, the decoded interfering symbols can be cancelled. This detection can be realized with either linear approaches (e.g., zero forcing, minimum mean square error based detection) or preferably with non-linear approaches (e.g., maximum likelihood detection, iterative detection techniques).

2.2.3. Extension of the Method

Although the above description is explained for a particular zone where both base stations use the same known modulation, the method previously described can be extended to the different cases. Generally speaking, one can define four different cases:

- the first one is what mentioned so far, where the FCH/DL-MAP is interfered by the other FCH/DL-MAP.
- the second case is when the data burst is interfered by a data burst from the interfering base station. For example, in FIG. 2, over the data allocation parts where both base stations use the same resources, similar estimation and detection techniques can be used to cancel co-channel interference of the data burst. Indeed, the data allocation as well as the corresponding modulation and transmission mode of the two base stations can be known by decoding FCH/DL-MAP of the two base stations. Then, for the data bursts sent in SIMO mode by both base stations and occupying the same position, the co-channel interference can also be cancelled by using the presented method.
- the third case can be defined where a data burst follows the FCH/DL-MAP in the first PUSC zone, while the DL-MAP of the interfering base station occupies more than one slot so that it reaches the second slot array of the first PUSC zone. In this case, the data burst from the serving base station is interfered by the DL-MAP of interfering base station. Since the mobile station can decode the FCH/DL-MAP of the interfering base station, the interference of the DL-MAP part of the interfering base station on its data burst can be cancelled.
- the fourth case is where the DL-MAP from serving base station extends to the second slot array of the first PUSC zone, while the interfering base station sends a data burst overlapping this position. Here, the desired DL-MAP is interfered by the data burst from the interfering base station. In order to cancel the interference on its DL-MAP, mobile station needs to detect the interfering data burst by decoding the FCH/DL-MAP of the interfering base station.

However, dealing with the last three cases require higher processing complexity.

In other words:

The method can be extended to the case where the data burst coming right after the DL-MAP in the first PUSC zone is interfered by the DL-MAP of the interfering BS. In this case, the mobile station decodes the DL-MAP of the interfering base station and cancels the interference on its data burst.

The method can be also extended to the case where a long DL-MAP which reaches to the second slot array of the first PUSC zone is interfered by a data burst from the interfering base station. In this case, the mobile station detects the interfering data burst by decoding the FCH/DL-MAP of the interfering base station and cancels the interference on its DL-MAP.

The method can be extended to the case where the data burst in the data zone (zone following the first PUSC zone) is interfered by a data burst coming from the interfering base station. In this case, the mobile station decodes the related information belonging to the neighbor base station. After decoding, mobile station knows the position and modulation format of the bursts belonging to the neighbor base station and cancels the interference accordingly.

Figure 4:
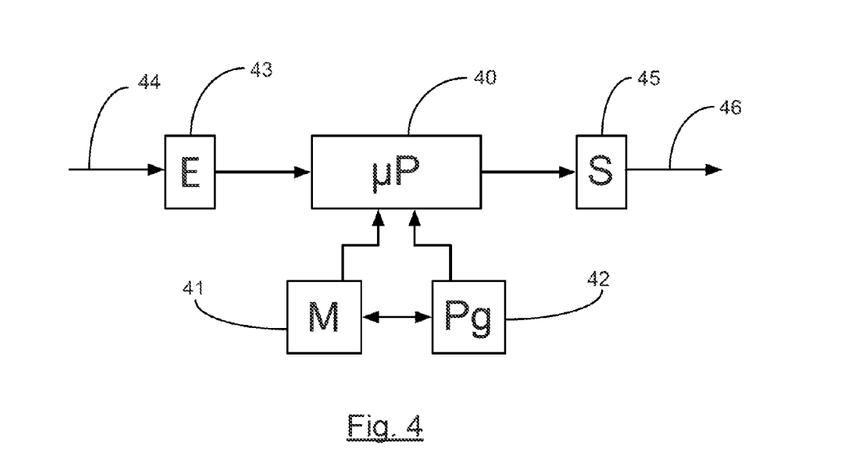
FIG. 4, is a high level description of an apparatus for the implementation of an embodiment of the invention.

The structure of an apparatus for the execution of the presented method is illustrated schematically in FIG. 4. It comprises a memory M 41, and a processing unit 40 equipped with a microprocessor μP, that is driven by a computer program (or application) Pg 42. At input, the processing unit 40 receives signal 44 through a network input interface module E 43. The microprocessor μP processes signal 44 according to the instructions of the program Pg 42, to cancel CCI and deliver the serving data and pilots 46 which will be transmitted through an interface module S 45. The apparatus can be included in a mobile station. It can be implemented as a specific chip or integrated in a preexistent chip. The apparatus comprises:

- a channel estimator, delivering a channel estimation of a serving signal transmitted by the serving base station and a channel estimation of an interfering signal transmitted by the interfering base station. The estimator is able to processed at least one of the estimation method which have already been described.
- a MIMO detector, detecting symbols by using the channel estimation of the serving signal and the channel estimation of the interfering signal. The MIMO detector is able to use any suitable detection method, like the one previously described.

The channel estimator and the MIMO detector can also be replaced by other equivalent means having similar functions as the ones previously disclosed.

A specific embodiment has previously been disclosed where the same modulation scheme is used by both serving and interfering base station. However, in its global form, what is need is the knowledge of the modulation schemes of both serving BS and interfering BS. For example, even serving BS has QPSK and interfering BS has 16QAM, the proposed method will work. Having the same modulation scheme is disclosed in the previous embodiment. This is also the reason why the disclosed method can be used in various scenarios such as (also described previously):

- control region interfered with control region (in Wimax both have modulation scheme of QPSK);
- control region interfered with data region (they may have different modulation scheme but both should be known by the MS);
- data region interfered with control region (they may have different modulation scheme but both should be known by the MS);
- data region interfered with data region (they may have different modulation scheme but both should be known by the MS).

Although the present disclosure has been described with reference to one or more examples, workers skilled in the art will recognize that changes may be made in form and detail without departing from the scope of the disclosure and/or the appended claims.

The invention claimed is:

1. A method comprising:
receiving a signal, referred to as a received signal, by a mobile station comprising at least two receiving antennas, in a cellular OFDMA-TDD communication network comprising a serving base station and at least one interfering base station, said received signal being a result of a serving signal transmitted by said serving base station which is distorted by at least one interfering signal transmitted by said at least one interfering base station, wherein said serving signal of said serving base station is transmitted with a first modulation scheme and wherein said interfering signal of said interfering base station is transmitted with a second modulation scheme, and cancelling co-channel interference in the received signal, wherein cancelling comprises:

a channel estimation phase delivering a channel estimation of a channel for the serving signal, which is transmitted by said serving base station, by using serving pilots, without taking into account interfering pilots, and delivering a channel estimation of a channel for the interfering signal, which is transmitted by said at least one interfering base station, by using interfering pilots, without taking into account serving pilots, said channel estimation phase comprising choosing an appropriate method of estimating the channels for the serving signal and the interfering signal in view of at least two preambles present in said received signal, and a MIMO detecting phase, detecting symbols by using said channel estimation for said serving signal and said channel estimation for said interfering signal by using a non-linear method which uses said first modulation scheme and said second modulation scheme.

2. The method according to claim 1, wherein the method comprises, before said channel estimation phase, a pre-processing phase which comprises:
extracting at least one information from at least two preambles present in said received signal,
deciding whether a dominant interfering base station exists in view of said information extracted from said at least two preambles, and when a dominant interfering base station exists:
processing said channel estimation phase and said MIMO detecting phase.

3. The method according to claim 2, wherein said at least one information extracted from said at least two preambles belongs to a group consisting of:
power level of said serving base station and of said at least one interfering base station,
system level parameters of said serving base station and of said at least one interfering base station.

4. The method according to claim 1, wherein said channel estimation generating step comprises an iterative process in which:
estimation of the channel for the serving signal of said serving base station is first made by using the serving pilots, without taking into account the interfering pilots,
estimation of the channel for the interfering signal of said interfering base station is obtained based on the interfering pilot by subtracting the reconstructed serving signal, by multiplying the known serving signal with the estimated desired channel.

5. The method according to claim 4, wherein said iterative process is improved by a measured $C/I_d$ value, where C denotes the received power of serving symbols and $I_d$ denotes the interfering base station power, said measured $C/I_d$ value being obtained from said at least two preambles, and comprises:
when said C value is greater or equal to said $I_d$ value:
estimation of the channel for the serving signal of said serving base station is first made by using serving pilots, without taking into account interfering pilots,
estimation of the channel for the interfering signal of said interfering base station is obtained based on the interfering pilot by subtracting the reconstructed serving signal, by multiplying the known serving signal with the estimated channel for the interfering signal,
when the C value is smaller than $I_d$ value:
estimation of the channel for the interfering signal of said serving base station is first made by using interfering pilots, without taking into account serving pilots,
estimation of the channel for the serving signal of said serving base station is obtained based on the serving pilot by subtracting the reconstructed interfering signal, by multiplying the known interfering signal with the estimated channel for the interfering signal.

6. The method according to claim 4, wherein, before implementing said iterative process, an initial channel estimation is done by using said at least two preambles, said initial channel estimation being used by said iterative process.

7. The method according to claim 1, wherein said MIMO detecting phase comprises:
detecting streams in the serving signal and the interfering signal by a MIMO detector in view of said estimations of the channels for the serving signal and the interfering signal,
extracting symbols transmitted from said serving base station and/or interfering base station for further treatment.

8. A mobile station comprising:
a receiver comprising at least two receiving antennas adapted to receive a signal, referred to as a received signal, from a cellular OFDMA-TDD communication network including a serving base station and at least one interfering base station, said received signal being a result of a serving signal transmitted by said serving base station which is distorted by at least one interfering signal transmitted by said at least one interfering base station, wherein said serving signal of said serving base station is transmitted with a first modulation scheme and wherein said interfering signal of said interfering base station is transmitted with a second modulation scheme, and
an apparatus adapted to cancel co-channel interference in the received signal, the apparatus comprising:
channel estimation means, delivering a channel estimation of a channel for said serving signal, which is transmitted by said serving base station, by using serving pilots, without taking into account interfering pilots, and delivering a channel estimation of a channel for said interfering signal, which is transmitted by said at least one interfering base station, by using interfering pilots, without taking into account serving pilots, said channel estimation means choosing an appropriate method of estimating the channels for the serving signal and the interfering signal in view of at least two preambles present in said received signal, and
MIMO detecting means, detecting symbols by using said channel estimation for said serving signal and said channel estimation for said interfering signal by using a non-linear method which uses said first modulation scheme and said second modulation scheme.

9. A computer program product on a non-transitory computer-readable medium executable by a microprocessor, said computer program product comprising program code instructions for performing a method comprising:

cancelling co-channel interference of a received signal that is received by a mobile station including at least two receiving antennas, in a cellular OFDMA-TDD communication network including a serving base station and at least one interfering base station, said received signal being a result of a serving signal transmitted by said serving base station which is distorted by at least one interfering signal transmitted by said at least one interfering base station, wherein said serving signal of said serving base station is transmitted with a first modulation scheme and wherein said interfering signal of said interfering base station is transmitted with a second modulation scheme, wherein cancelling comprises:

a channel estimation phase delivering a channel estimation of a channel for said serving signal, which is transmitted by said serving base station, by using serving pilots, without taking into account interfering pilots, and delivering a channel estimation of a channel for said interfering signal, which is transmitted by said at least one interfering base station by using interfering pilots, without taking into account serving pilots, said channel estimation phase comprising choosing an appropriate method of estimating the channels of the serving signal and the interfering signal in view of at least two preambles present in said received signal, and a MIMO detecting phase, detecting symbols by using said channel estimation for said serving signal and said channel estimation for said interfering signal by using a nonlinear method which uses said first modulation scheme and said second modulation scheme.

* * * * *